US008655963B2

(12) United States Patent
Sasaki (10) Patent No.: US 8,655,963 B2
(45) Date of Patent: Feb. 18, 2014

(54) TRANSMISSION APPARATUS AND RECEPTION APPARATUS FOR MESSAGE AND METHOD OF DATA EXTRACTION

(75) Inventor: Osamu Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/572,863

(22) Filed: Oct. 2, 2009

(65) Prior Publication Data

US 2010/0088383 A1     Apr. 8, 2010

(30) Foreign Application Priority Data

Oct. 6, 2008   (JP) .................................. 2008-259676

(51) Int. Cl.
*G06F 15/16*     (2006.01)

(52) U.S. Cl.
USPC ........................................................ 709/206

(58) Field of Classification Search
USPC .......................................... 709/203, 206, 207
See application file for complete search history.

(56) References Cited

U.S. PATENT DOCUMENTS

| | | | | |
|---|---|---|---|---|
| 5,828,466 A | * | 10/1998 | Imai et al. ...................... | 358/404 |
| 5,930,004 A | * | 7/1999 | Imai et al. ...................... | 358/442 |
| 6,333,794 B2 | * | 12/2001 | Imai et al. ...................... | 358/1.9 |
| 6,785,712 B1 | * | 8/2004 | Hogan et al. .................. | 709/206 |
| 6,842,768 B1 | * | 1/2005 | Shaffer et al. ................. | 709/203 |
| 7,287,058 B2 | * | 10/2007 | Loveland et al. ............. | 709/206 |
| 7,447,743 B1 | * | 11/2008 | Jordan, Jr. ..................... | 709/206 |
| 8,270,421 B2 | * | 9/2012 | Elliott et al. .................. | 370/401 |
| 2001/0043344 A1 | * | 11/2001 | Imai et al. ...................... | 358/1.9 |
| 2001/0056470 A1 | * | 12/2001 | Ishitani ......................... | 709/206 |
| 2003/0187939 A1 | * | 10/2003 | O'Brien ......................... | 709/206 |
| 2005/0193145 A1 | * | 9/2005 | Brown et al. ................. | 709/238 |
| 2005/0223059 A1 | * | 10/2005 | Ochi et al. .................... | 709/204 |
| 2006/0106609 A1 | * | 5/2006 | Saito et al. .................... | 704/260 |
| 2006/0192990 A1 | * | 8/2006 | Tonegawa ................... | 358/1.15 |
| 2010/0020941 A1 | * | 1/2010 | Walker, III ..................... | 379/38 |
| 2010/0171985 A1 | * | 7/2010 | Tonegawa ................... | 358/1.15 |
| 2010/0299398 A1 | * | 11/2010 | Nagoya et al. ............... | 709/206 |
| 2012/0177195 A1 | * | 7/2012 | Elliott et al. .................. | 379/240 |

FOREIGN PATENT DOCUMENTS

JP       2008-109381       5/2008

* cited by examiner

*Primary Examiner* — Sargon Nano
(74) *Attorney, Agent, or Firm* — Canon USA, Inc., IP Division (57) ABSTRACT

A reception apparatus which receives a first and second message includes a determination unit configured to determine correspondence between the first message and the second message, an acquisition unit configured to acquire data length information expressing a data length from the first message, and an extraction unit configured to extract data which has the data length based on the data length information from the second message when the determination unit determines that the first message corresponds to the second message.

7 Claims, 5 Drawing Sheets

TRANSMISSION APPARATUS AND RECEPTION APPARATUS FOR MESSAGE AND METHOD OF DATA EXTRACTION

BACKGROUND OF THE INVENTION

1. Field of the Invention

The present invention relates to a transmission apparatus and reception apparatus for messages and to a method of data extraction performed by the reception apparatus.

2. Description of the Related Art

Conventionally, when electronic emails or messages using Simple Object Access Protocol (SOAP) are sent or received, a file or files are often attached to the main message. Multi-purpose Internet Mail Extension (MIME/Multipart) is widely employed as a format for file attachment. MIME/Multipart packages a plurality of parts into a single multipart message using boundary character strings to separate the main message and attached files.

In Japanese Patent Application Laid-Open No. 2008-109381, a main mail part and an attached file part are separated by boundary character strings detected within the multipart message.

However, an operation for extracting data included in multipart messages may largely increase a processing load.

In other words, extracting data from a certain part of a multipart message in the MIME/Multipart format requires reading data in sequence from the beginning of the multipart message and comparing the read data with the boundary character strings. As a result, in particular when large capacity data is attached, the processing load on a receiver is greatly increased.

The present invention is related to reducing a processing load in extracting data included in a multipart message.

SUMMARY OF THE INVENTION

According to an aspect of the present invention, a reception apparatus which receives a first and second message includes a determination unit configured to determine correspondence between the first message and the second message, an acquisition unit configured to acquire data length information expressing a data length from the first message, and an extraction unit configured to extract data which has the data length based on the data length information from the second message when the determination unit determines that the first message corresponds to the second message.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
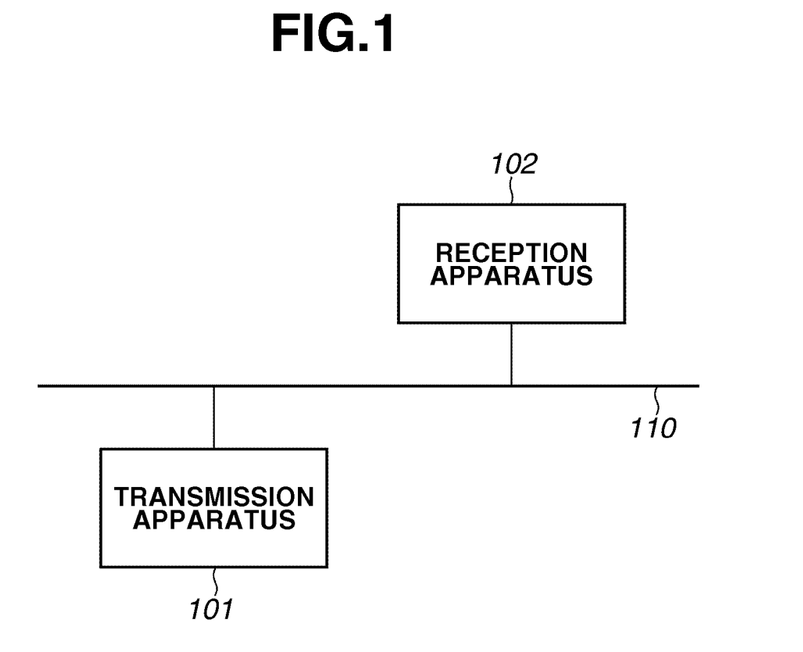
FIG. 1 is a network configuration example according to an exemplary embodiment of the present invention.

FIG. 1 is a block diagram illustrating a network configuration example according to an exemplary embodiment. Although both of communication apparatuses 101 and 102 in FIG. 1 have equivalent functions, the present exemplary embodiment will describe a case where a message is transmitted from a transmission apparatus 101 to a reception apparatus 102. The transmission apparatus 101 and the reception apparatus 102 are interconnected by a network 110.

A hardware configuration of the transmission apparatus 101 and the reception apparatus 102 will be described with reference to FIG. 2. As described above, the transmission apparatus 101 and the reception apparatus 102 in the present exemplary embodiment are communication apparatuses having equivalent functions. However the transmission apparatus 101 may be a dedicated apparatus for sending messages and the reception apparatus may be a dedicated apparatus for receiving messages. Further, the transmission apparatus 101 and the reception apparatus 102 may be configured by devices which can perform message communication, such as personal computers (PCs), work stations, laptop PCs, and various types of domestic electrical devices with built-in computers, game hardware, mobile telephones, digital video cameras, and digital cameras.

Figure 2:
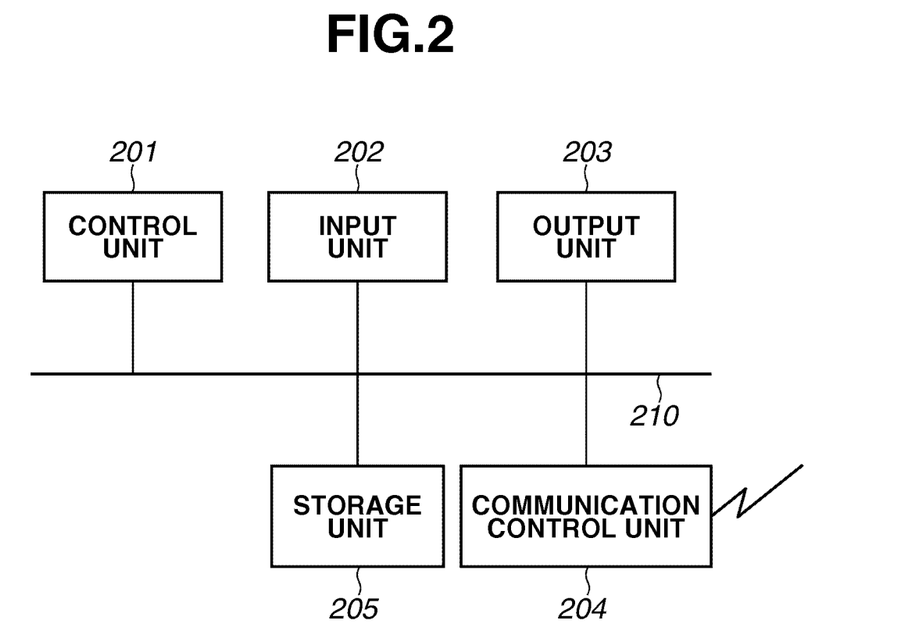
FIG. 2 illustrates a hardware configuration example of a transmission apparatus and a reception apparatus.

FIG. 2 is a block diagram illustrating a hardware configuration example of the transmission apparatus 101 and the reception apparatus 102. The transmission apparatus 101 and the reception apparatus 102 are respectively provided with a control unit 201, an input unit 202, an output unit 203, a communication control unit 204 and a storage unit 205.

In FIG. 2, the control unit 201 includes a central processing unit (CPU), a read only memory (ROM), a random access memory (RAM) and peripheral equipment and performs overall control of the apparatus. The input unit 202 includes an interface for connecting a keyboard, a mouse or the like and controls various inputs and commands to the own apparatus.

The output unit 203 includes an interface for connecting a display or the like and controls outputs such as processing results or the operating state of the own apparatus. The communication control unit 204 includes an interface for communicating with a network and controls communication with other communication apparatuses via a network 110.

The storage unit 205 includes an interface for controlling access to a large capacity storage device. Each of the above units is connected by a system bus 210.

A flow of transmission and reception processing of a multipart message performed between the transmission apparatus 101 and the reception apparatus 102 will be described with reference to FIG. 3. A multipart message is composed of a plurality of parts including a main message part and one or more attached-file parts.

A message including a plurality of parts can be sent and received as a single multipart message by separating the main message and the attached files using boundary character strings. An example of a message sent and received as a multipart message is an email or a SOAP message.

Figure 3:
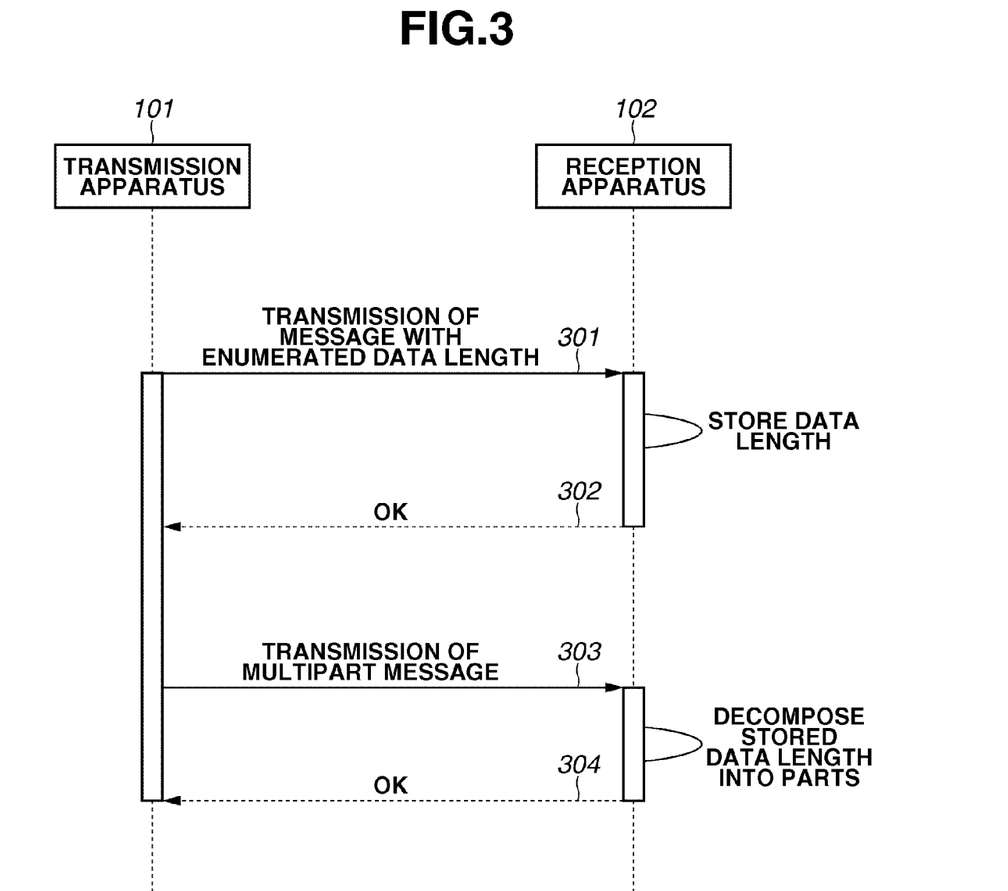
FIG. 3 illustrates a schematic sequence for sending and receiving messages.

FIG. 3 illustrates a schematic sequence when a multipart message from the transmission apparatus 101 to the reception apparatus 102 is sent and received.

In step S301, the transmission apparatus 101 sends message information (first message) including MessageId, ContentId and a data length of each part via the communication control unit 204 to the reception apparatus 102.

The MessageID is identification information (MessageID) of the multipart message (second message) to be sent. The ContentID is identification information (ContentID) of each part included in the second message which is the multipart message. The data length is information regarding the data length of each part of the second message. The MessageID is a character string individually assigned to the multipart message. The ContentID is the character string individually assigned respectively to contents of each part sent in the multipart message.

In other words, the message information includes the identification information (MessageID) for the multipart message to be sent, the identification information (ContentID) for each part included in the multipart message, and the information about the data length of each part.

An Action value is sent for each SOAP message via a transport protocol. The reception apparatus 102 uses the Action value in a received message to determine whether the received message is the message information (first message).

In step 301, the reception apparatus 102, after receipt of the message information (first message) via the communication control unit 204, stores each data included in the message in the RAM included in the control unit 201.

In step 302, the reception apparatus 102 sends a reception confirmation of the message information to the transmission apparatus 101 via the communication control unit 204 and processing proceeds to step 303.

In step 303, the transmission apparatus 101 sends the multipart message (second message) which has the same MessageID as the message information sent in step 301 to the reception apparatus 102 via the communication control unit 204.

Thus the transmission apparatus 101 in the present exemplary embodiment sends the multipart message after receipt of the reception confirmation of the message information. In this manner, it can be prevented that the reception apparatus 102 is hindered from extracting parts using the message information due to receiving the multipart message before completing reception processing of the message information.

The transmission apparatus 101 in the present exemplary embodiment resends the message information (first message) when the reception confirmation of the message information is not received after a fixed time period has elapsed from sending the message information. In this manner, resent message information can be acquired when the reception apparatus 102 cannot receive the message information in a normal manner due to some reason. However the multipart message may be sent without resending the message information.

In step 303, when the reception apparatus 102 has received the multipart message, the reception apparatus 102 determines whether data for the message information corresponding to the received multipart message is stored. When the data for the message information corresponding to the multipart message is stored, a data length value for each part is read out. In other words, in step 303, the reception apparatus 102 searches the RAM for a MessageID which is the same as the MessageID included in the received multipart message. When the MessageID is included in the RAM, a data length for each part which is correlated with the MessageID and stored is read out.

Figure 4:
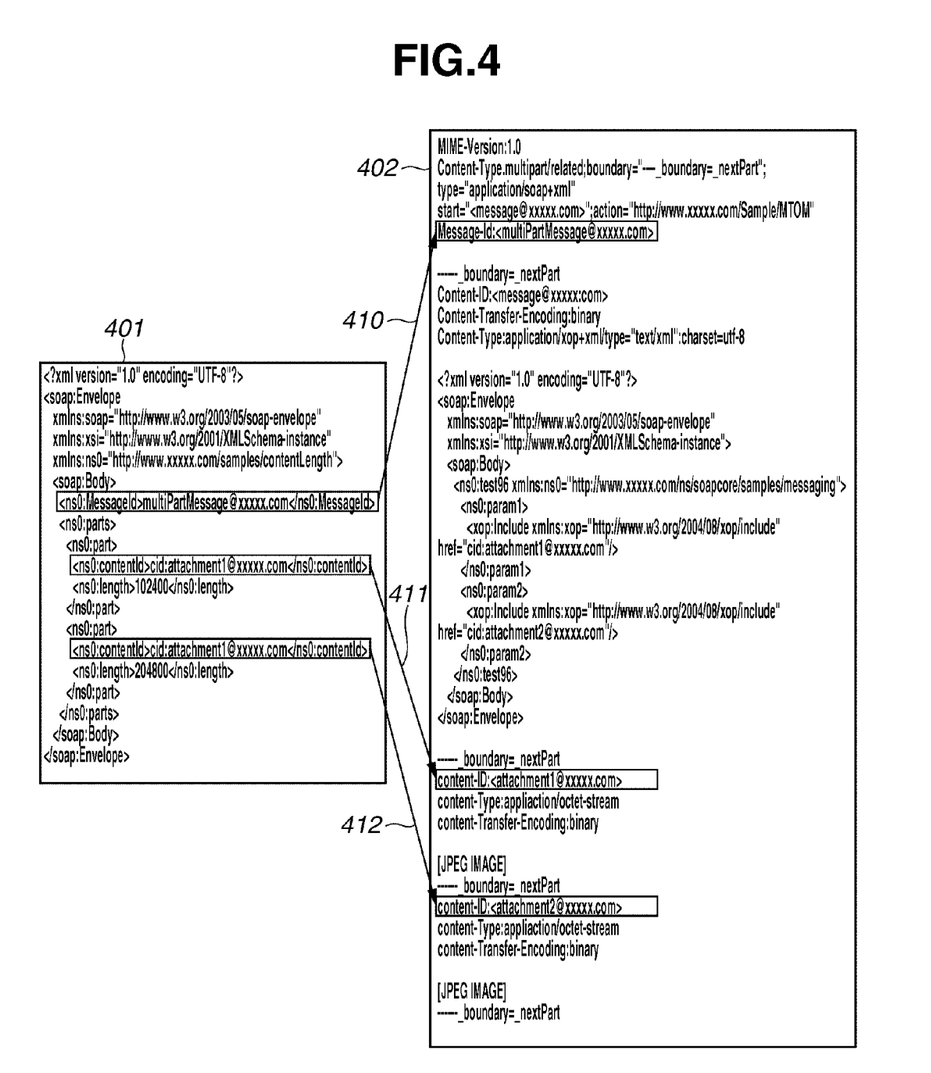
FIG. 4 is a diagram of an example message.

FIG. 4 is a diagram of an example of message information and a multipart message. The multipart message sent in the present exemplary embodiment is a SOAP message. Generally SOAP messages are communicated using Hypertext Transfer Protocol (HTTP) as a transport protocol. However the present invention can be applied to transmission using Simple Mail Transfer Protocol (SMTP) or other protocols.

FIG. 4 illustrates an example of message information 401 sent in step 301 and an example of a multipart message 402 sent in step 303.

As shown in FIG. 4, the MessageID included in <soap:Body> (SOAP body) in the message information 401 is the same character string as the MessageID included in a header of the multipart message 402. This fact demonstrates that the message information 401 corresponds to the multipart message 402. In other words, the message information 401 illustrated in FIG. 4 shows that it is message information in which the data length of each part of the multipart message 402 is enumerated.

A parts element following the MessageId element of the message information can include a plurality of part elements. A ContentId of the part corresponding to the multipart message 402 is included in a contentId element described as a child element of each part element.

Respective data lengths of the parts corresponding to the multipart message 402 are described in length elements which are child elements of each ContentID. In other words, one part element described in the message information 401 corresponds to one part in the multipart message 402. The data length of the part corresponding to the multipart message 402 is described in the length element included in the part element.

In the present exemplary embodiment, a ContentId (attachment1@canon.com) of a first attached file in the multipart message 402 is described in the message information 401 as shown by an arrow 411. A ContentId (attachment2@canon.com) of a second attached file in the multipart message 402 is described in the message information 401 as shown by an arrow 412.

Although the data length included in the message information 401 is a data length of the attached file included in the multipart message 402, the data length of the header (ContentID and the like in FIG. 4) of the attached file is not included.

Next, processing performed by the reception apparatus 102 when receiving the message information and the multipart message will be described in detail with reference to FIG. 5.

The reception apparatus 102 receives the message information (first message) and the multipart message (second message). Further, the reception apparatus 102 in the present exemplary embodiment performs each processing described with reference to FIG. 5 based on a stored program. In other words, the control unit 101 of the reception apparatus 102 reads a suitable program related to the present invention which is stored in the storage unit 205 and executes the processing. As described above, the control unit 101 of the reception apparatus 102 includes the CPU, ROM and RAM.

Figure 5:
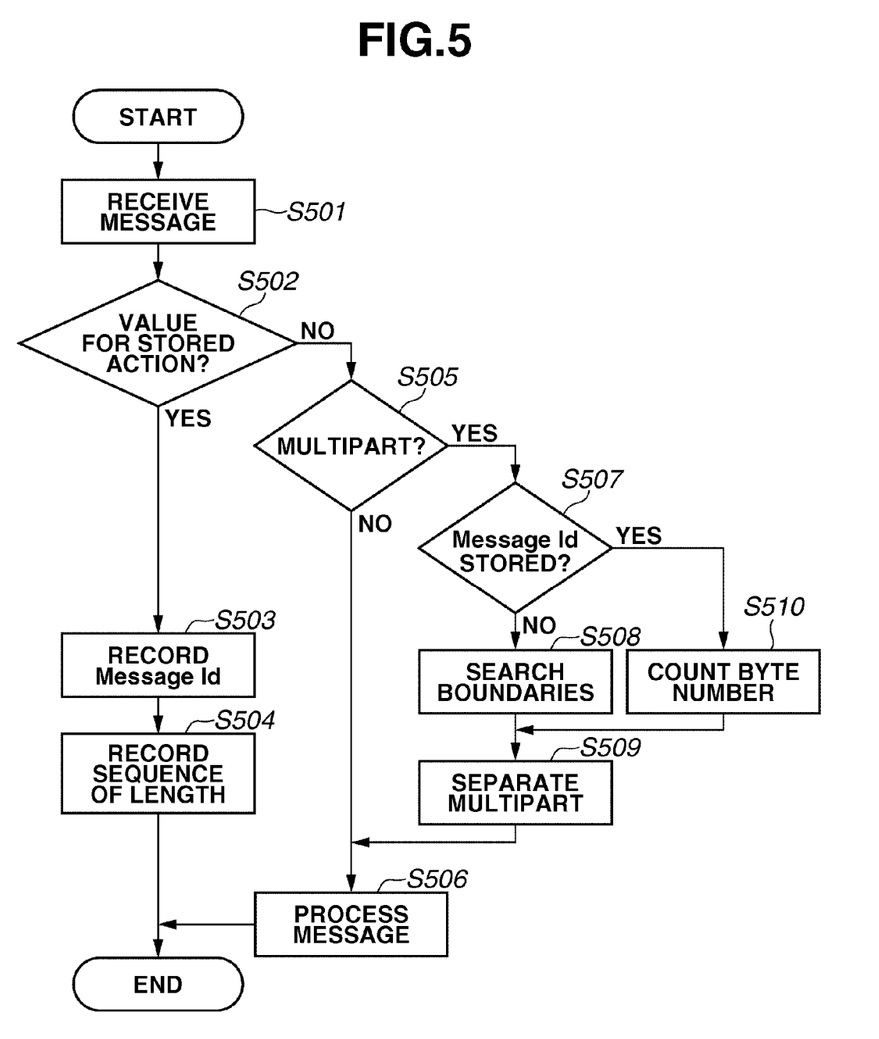
FIG. 5 is a flowchart illustrating processing for receiving a message by a reception apparatus.

FIG. 5 is a flowchart illustrating the detailed processing for receiving a message by the reception apparatus 102.

When the reception apparatus 102 receives a message in step S501, the processing proceeds to step S502.

In step S502, the control unit 201 of the reception apparatus 102 determines whether the Action value included in the received message coincides with an Action value of the message information in which the data lengths are enumerated. The Action value corresponding to the message information is predetermined.

In step S502, when the Action value of the received message coincides with the Action value of the message information, the control unit 201 determines that it is the message information 401 (YES in step S502), and the processing proceeds to step S503. When the Action value of the received message does not coincide with the Action value of the message information, the control unit 201 determines that it is not the message information (NO in step S502), and the processing proceeds to step S505. In other words, in step S502, the control unit 201 determines whether the message received in step S501 is the message information.

In step S503, the control unit 201 reads a body of the message information, stores the MessageId acquired from the body, and the processing proceeds to step S504. As described above, the control unit 201 includes the CPU, RAM and ROM.

In step S504 (acquisition sequence), the control unit 201 reads the body of the message information, forms a set of a value of the ContentId acquired from the body and the corresponding data length value, stores the set by correlating with the MessageId, and completes the reception processing.

In other words, in step S504, the control unit 201 acquires data length information expressing the data length from the message information (first message).

Consequently, when the processing in step S504 is completed, the MessageID, the ContentID of each part included in the message and the data length of each part are correlated and stored in the control unit 201 of the reception apparatus 102.

As illustrated in the example in FIG. 4, when a plurality of parts is present in the multipart message 402, a ContentID is added to each part. In other words, the multipart message (second message) includes apart (first data) indicated by the ContentID attachment1@canon.com and apart (second data) indicated by attachment1@canon.com.

Upon receipt of the message information, in step S504, the control unit 201 acquires information about a first data length (102400) and ContentID of the first data and information for a second data length (204800) and ContentID for the second data.

In other words, in step S504, the control unit 201 acquires from the message information the first data length information including the identification information (ContentID) of the first data and the second data length information including the identification information (ContentID) of the second data which are included in the multipart message.

In step S502, when the Action value is different from the Action value which is previously recorded in the message information, in step S505, the control unit 201 determines whether the sent message is a multipart message. When the sent message is not the multipart message (NO in step S505), in step S506, the control unit 201 processes the message is processed and finishes the processing. The information included in the header of the sent massage is used to determine whether the sent message is the multipart message.

Conversely, in step S505, when it is determined that the sent message is the multipart message (YES in step S505), the processing proceeds to step S507.

In step S507 (determination sequence), the control unit 201 of the reception apparatus 102 checks whether the MessageId of the multipart message is stored in the control unit 201 of the reception apparatus 102. When the message information corresponding to the multipart message has already been received, the MessageID is stored in the control unit 201.

In other words, in step S507, the control unit 201 of the reception apparatus 102 determines whether the message information (first message) corresponds to the multipart message (second message).

The control unit 201 determines whether the message information corresponds to the multipart message based on the identification information (MessageID). When the MessageId of the multipart message sent to the reception apparatus 102 is not stored (NO in step S507), the processing proceeds to step S508.

In step S508, the control unit 201 of the reception apparatus 102 performs normal processing for identifying delimiters of the parts in the MIME-Multipart. In other words, the control unit 201 reads in sequence from the beginning of the multipart message, compares the read data with the boundary character string, and identifies those positions at which the boundary character strings are present as the delimiters of parts. Then, the processing proceeds to step S509.

Conversely, in step S507, when the MessageId is determined to be stored in the control unit 201 of the reception apparatus 102 (YES in step S507), the processing proceeds to step S510.

In step S510, the control unit 201 extracts the set of the data length value and the ContentId which is correlated with the MessageId and acquires the data length from the ContentId described in the header of each part of the MIME-Multipart. The control unit 201 reads in sequence from the beginning of the multipart message.

As a result, when the ContentID stored in step S504 is detected, the control unit 201 counts a read-out byte number without comparing with the boundary character strings after the header of the ContentID. A position at which a count number coincides with the acquired data length is identified as the delimiter of the part. The processing then proceeds to step S509. A check may be performed of whether the boundary character string is present at the position of coincidence between the count number and the acquired data length.

In the present exemplary embodiment, the control unit 201 detects a character string to identify a start position of apart attached to the main body of the message. In other words, the control unit 201 reads the character string from the beginning of the message and detects the character string (boundary character string) indicating the start of the attached part. Then the separation of that part is specified using the above information regarding the data length from the detected character string.

In step S504, when a plurality of pieces of the data length information is acquired, the control unit 201 identifies the respective delimiters of the plurality of parts based on the plurality of pieces of the data length information. In S510, the control unit 201 identifies the delimiter of the part and the processing proceeds to step S509.

In step S509 (extraction sequence), the control unit 201 extracts each part of the multipart message based on the delimiter of the parts identified in step S508 or step S510. In other words, for example, when the data length information is acquired from the message information in step S510, the data (part) having the data length is extracted based on the information.

Thus, in step S509, the control unit 201 extracts the data having the data length based on the data length information from the multipart message (second message) which is determined to correspond to the message information (first message).

In step S504, when a plurality of pieces of the data length information is acquired, the data for the plurality of parts is extracted based on the plurality of pieces of the data length information.

In other words, the control unit 201 extracts the first data included in the multipart message based on the first data length information and extracts the second data included in the multipart message based on the second data length information.

In step S508, when the separation of the part is identified by detecting the boundary character string, each part is extracted based on the detection result. After extracting each part, in step S509, the control unit 201 executes processing corresponding to part data and finishes the message reception processing. Processing corresponding to the part data includes, for example, displaying, reproducing, and recording of the part data.

As described above, the reception apparatus 102 of the present exemplary embodiment switches the processing for extracting each part according to whether the message information corresponding to the received multipart message is stored.

In other words, when the message information corresponding to the multipart message is stored, each part is extracted using the value described in the length (data length) of each part element included in the message information. On the other hand, when the message information corresponding to the multipart message is not stored, the data in the received message is read in sequence and each part is extracted based on the delimiter of each part identified by a comparison with the boundary character string indicating the separation of each part.

In this manner, the reception apparatus 102 can extract data of each part by searching for boundaries when a multipart message is received from a transmission apparatus which has not sent message information in which data lengths are enumerated in advance. Conversely, when a multipart message is received from a transmission apparatus which sends message information in which data lengths are enumerated in advance, the reception apparatus 102 can extract data of each part by simply counting a byte number without searching for boundaries. Thus data of each part can be extracted from a multipart message more rapidly without impeding mutual interconnectedness.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-259676, filed Oct. 6, 2008, hereby incorporated by reference herein in its entirety.

What is claimed is:

1. A reception apparatus which receives a first message having a MessageID, a ContentID of a part included in the first message, and data length information expressing a data length of part data of a second message, and the second message having a MessageID, the reception apparatus comprising:

a storage unit configured to correlate and store the data length information and the MessageID about the second message in the first message;

a determination unit configured to determine correspondence between the first message stored in the storage unit and the second message by comparing the MessageID of the first message with the MessageID of the second message;

an acquisition unit configured to acquire the data length information expressing the data length of the part data of a second message from the first message; and an detection unit configured to detect boundary position of the part data from the second message by counting a read-out byte number without comparing with boundary character strings after a header of the ContentID so as to identify a boundary of the part data based on the data length information acquired from the first message and to extract, from the second message, the part data which has the data length when the determination unit determines that the first message corresponds to the second message, wherein when the data length information corresponding to the received second message is stored in the storage unit.

2. The reception apparatus according to claim 1, wherein the first message includes identification information about a corresponding second message, and the determination unit uses the identification information to determine whether the first message corresponds to the second message.

3. The reception apparatus according to claim 2, further comprising:

a storage unit configured to correlate and store the data length information and the identification information about the second message; and a detection unit configured to detect a character string expressing separation of the data from other data from the second message, wherein when the data length information corresponding to the received second message is not stored in the storage unit, the extraction unit extracts data which has the data length in response to the detection of the character string by the detection unit.

4. The reception apparatus according to claim 1, wherein the acquisition unit acquires, from the first message, first data length information including identification information about first data included in the second message and second data length information including identification information about second data included in the second message, and the extraction unit extracts the first data included in the second message based on the first data length information and extracts second data included in the second message based on the second data length information.

5. The reception apparatus according to claim 1, further comprising:

a detection unit configured to detect a character string expressing start of the data from the second message, wherein the extraction unit extracts the data which has the data length based on the detected character string and the data length information.

6. A method for extracting data performed by a reception apparatus which receives a first message having a MessageID, a ContentID of a part included in the first message, and data length information expressing a data length of the part, and a second message having a MessageID, the method comprising:

determining whether the first message corresponds to the second message by comparing the MessageID of the first message with the MessageID of the second message;

acquiring the data length information expressing the data length of the part from the first message; and extracting start position of part data by counting a read-out byte number without comparing with boundary character strings after a header of the ContentID so as to identify a delimiter of the part based on the data length information from the first message when the second message is determined to correspond to the first message.

7. A non-transitory computer-readable storage medium storing a program, which when loaded into a computer and executed causes the computer which receives a first message having a MessageID, a ContentID of a part included in the first message, and data length information expressing a data length of the part, and a second message having a MessageID, to execute instructions, the instructions comprising:

determining, using a processor, whether the first message corresponds to the second message by comparing the MessageID of the first message with the MessageID of the second message;

acquiring the data length information expressing the data length of the part from the first message; and extracting, using the processor, start position of part data by counting a read-out byte number without comparing with boundary character strings after a header of the ContentID so as to identify a delimiter of the part based on the data length information from the first message when the second message is determined to correspond to the first message.

* * * * *